United States Patent

[11] 3,630,303

[72] Inventor Armand Froumajou
Pontoise, France
[21] Appl. No. 802,171
[22] Filed Feb. 25, 1969
[45] Patented Dec. 28, 1971
[73] Assignees Automobiles Peugeot
Paris, ;
Regie National des Usines Renault
Billancourt, France, part interest to each
[32] Priority May 15, 1968
[33] France
[31] 151820

[54] FRONT SUSPENSION FOR A FRONT DRIVE VEHICLE
4 Claims, 4 Drawing Figs.

[52] U.S. Cl. .................................................... 180/43, 280/962
[51] Int. Cl. .................................................... B60k 17/30, B60g 3/20
[50] Field of Search ....................................... 150/43, 42; 280/96.2, 124.1

[56] References Cited
UNITED STATES PATENTS

| | | | |
|---|---|---|---|
| 2,228,413 | 1/1941 | Smalley | 180/43 |
| 2,455,429 | 12/1948 | Lucien | 180/436 X |
| 3,123,348 | 3/1964 | Hildebrandt | 280/124.1 X |
| 3,257,121 | 6/1966 | Muller | 280/96.2 |

FOREIGN PATENTS

| 712,032 | 6/1965 | Canada | 180/43 |

*Primary Examiner*—A. Harry Levy
*Attorney*—Burns, Doane, Swecker & Mathis

ABSTRACT: A front suspension for a front drive vehicle having lower and upper wishbones and a damping support device including a hydraulic jack and a coaxial coil spring. The lower part of the hydraulic jack is connected to the transverse support arm of the lower wishbone through a yoke whereby the hydraulic device straddles the transmission shaft of the vehicle. The pivot centers of the rear arm of the lower wishbone are on a line perpendicular to the wheel plane and the pivot centers of the steering link rod connecting the swivel axle unit of the wheel to the steering rack are on a line making an obtuse angle with the wheel plane.

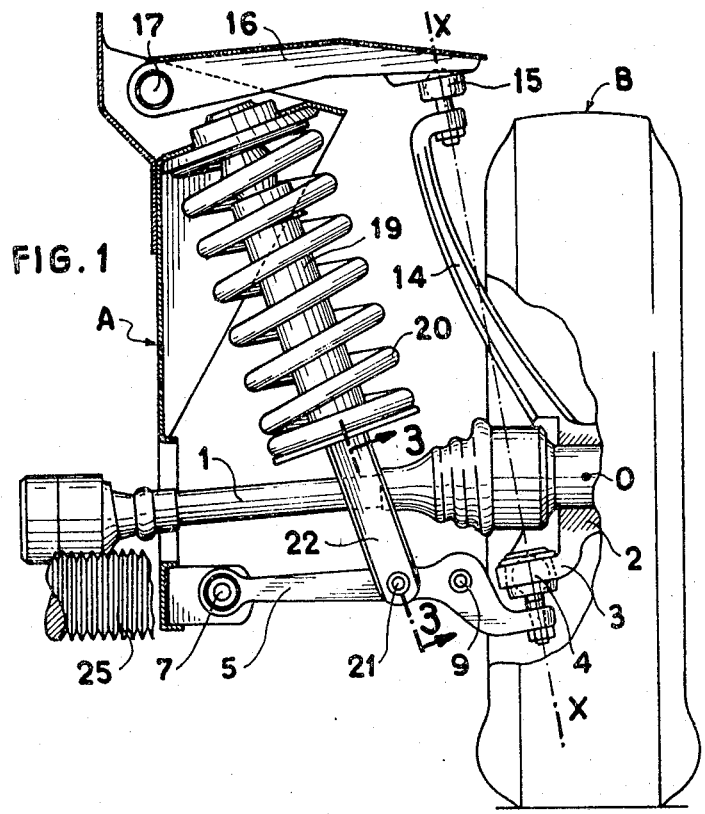
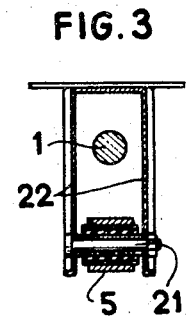
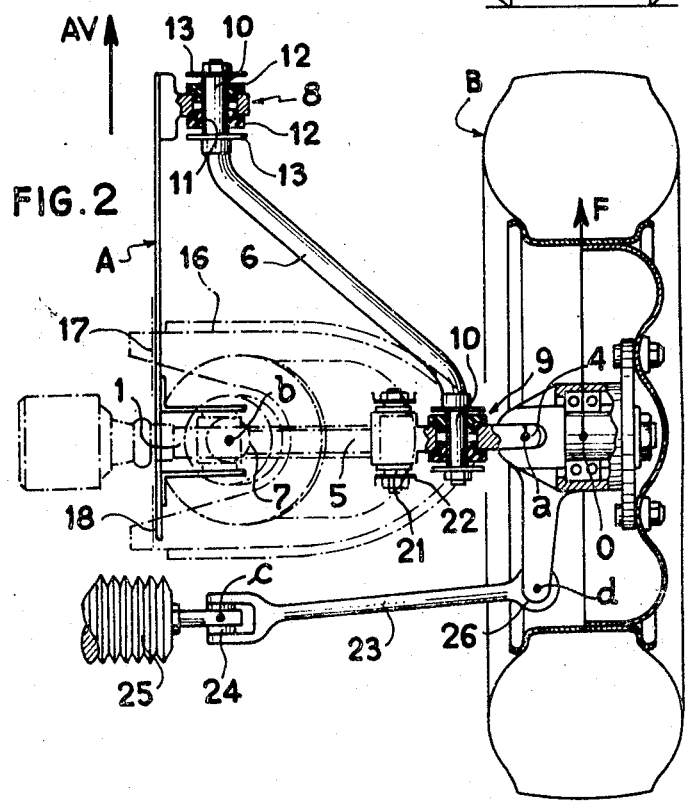
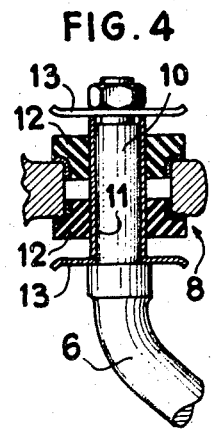

FRONT SUSPENSION FOR A FRONT DRIVE VEHICLE

The present invention relates to an improved suspension for a front drive and steering wheel of an automobile vehicle, said suspension being of the type having upper and lower wishbones and a supporting and damping device consisting of a hydraulic shock absorber and a coaxial coil spring.

The invention provides a suspension wherein the lower part of the hydraulic shock absorber device is connected to the transverse support arm of the lower wishbone through a yoke whereby it straddles the transmission shaft.

Compared to the usual arrangements in which the damper is fixed either above the transmission shaft or on the lower wishbone and is disposed to one side of this transmission shaft, the arrangement according to the invention affords the following advantages:

the height of the suspension off the ground is reduced and this facilitates accommodating it in the vehicle;

it is possible to adopt an assembly geometry which achieves under the best conditions the filtering of the rolling noises and directional stability.

Further features and advantages of the invention will be apparent from the ensuing description with reference to the accompanying drawing.

IN THE DRAWING

FIG. 1 is an elevational view of a suspension according to the invention;

FIG. 2 is a plan view thereof partly in section;

FIG. 3 is a partial sectional view taken along line 3—3 of FIG. 1, and

FIG. 4 is a sectional view similar to FIG. 2, on an enlarged scale, of one of the pivotal mountings of the front arm of the lower wishbone.

According to the illustrated embodiment, the body of the vehicle is designated by the reference character A and the front wheel, which is both a driving and steering wheel, by the reference character B. The front end of the vehicle is indicated by the arrow AV in FIG. 2.

This wheel is driven in rotation by a transmission shaft 1 which is contained in a plane roughly vertical and perpendicular to the plane of the wheel and is journaled in a conventional manner in a swivel stub axle unit 2.

A lower extension 3 of this stub axle unit is connected, through a ball joint 4 constituting a lower pivot point of the wheel, to an arm 5 which is roughly transversal and constitutes the rear support element of a lower wishbone whose front element consists of the arm 6.

The other end of the rear arm 5 is connected to the body through an elastically yieldable pivot 7 whose pivot axis is parallel to the longitudinal axis of the vehicle.

The front arm 6 is secured to the body through a flexible pivot 8 aligned with the pivot 7 of the rear arm and, moreover, to the rear arm 5 through a flexible pivot 9 identical to the pivot 8. The pivot axis of this pivot 9 is also parallel to the longitudinal axis of the vehicle.

In respect of each of these pivots 8 and 9, the center journal or spindle 10 constituting the front end or rear end of the front arm 6 is journaled (see FIGS. 2 and 4) in a metal bush 11 maintained in two elastically yieldable sleeves 12 each provided with an outer shoulder. The distance between the outer flanks of the shoulders of the two sleeves 12 is less than the lengths of the bushes 11 which is defined at each end by a flange or plate 13. This arrangement imparts to the assembly great flexibility for slight movements of rotation in plan of the arm 5 about the pivot 7. These movements are limited by the abutment of shoulders of the sleeves 12 against the flanges 13 so as to permit the transmission of considerable forces which arise in the course of rapid acceleration or braking.

An upper extension 14 of the stub axle unit 2 is connected, through a ball joint 15 constituting an upper pivot point of the wheel, to an upper wishbone 16. The latter is connected to the body by two pivots 17 and 18 having a common pivot axis which is parallel to the longitudinal axis of the vehicle.

A damping and support device constituted in a conventional manner by a hydraulic shock absorber 19 and a concentric spring 20, connects the body A to the lower rear arm 5, this device being pivoted to the arm 5 through a yoke 22 whereby the device can straddle the transmission shaft 1.

The wheel is steered through a link rod 23 pivoted at 24 to the rack 25 and at 26 to the stub axle unit 2. This steering unit is located at the rear of the axis of the wheel roughly in the horizontal plane of the lower wishbone.

As will be understood, the arrangement according to the invention affords the advantage of facilitating the accommodation of a damper of suitable length for a small height of the suspension off the ground, as in the case of a damper located to one side of the transmission shaft. Moreover, it ensures improved directional stability and a filtration of the rolling noises owing to the possibility, by virtue of the yoke 22, of placing the support arm 5 in a position perpendicular to the longitudinal axis of the vehicle notwithstanding the presence of the transmission shaft. This is impossible when this damper is located to one side of the transmission shaft.

Directional stability is achieved as a consequence of the configuration in plan of the quadrilateral abcd (FIG. 2) the corners of which consist of the centers of the pivots or ball joints 4 and 7 of the rear lower arm 5 and 24 and 25 of the steering link rod 23, and in taking into consideration the microdeformations which occur for example upon application of a traction force (the same reasoning could apply in the case of braking, the deformations being in this case in the opposite direction).

The application of a traction force F at the center O (FIG. 2) of the wheel B results, on one hand, in a torque about the axis X—X (FIG. 1) intersecting the centers of the lower pivot 4 and upper pivot 15 and, on the other hand, in a slight forward displacement of the wheel B relative to the body A.

The torque about the axis X—X tends to steer the wheel inwardly and results in a toe-in, whereas the movement of the wheel forwardly of the body A tends to steer the wheel in the opposite opening direction owing to the quadrilateral shape abcd of which the side ab, embodied by the arm 5, is perpendicular to the plane of the wheel, whereas the side cd, embodied by the steering link rod 23, makes an obtuse angle with this plane.

A perfect directional stability is therefore guaranteed by the opposition of these tendencies which cancel one another out.

The rolling vibrations and noises are filtered by the particular arrangement of the pivots 8 and 9 which have sufficient flexibility to permit the rear arm 5 to undergo slight movements of rotation in plan about the elastically yieldable pivot 7 so as to absorb the short longitudinal displacements of the wheel relative to the body A.

Although a specific embodiment of the invention has been described, many modification and changes may be made therein without departing from the scope of the invention as defined in the appended claims.

In particular, the front arm 6 of the lower wishbone could be part of a torsion bar interconnecting the two front wheels.

Having now described my invention what I claim as new and desire to secure by Letters patent is:

1. A front suspension and steering structure for a front drive vehicle having a longitudinal axis and a body structure, said suspension comprising a wheel, a swivel axle unit carrying the wheel which is contained in a plane parallel to said axis, an upper wishbone structure pivoted at one end to the axle unit and at another end to the body structure, a lower wishbone structure having a front arm and a rear arm, first pivotal connections respectively connecting a first portion of the front arm to the body structure and a second portion of the front arm to the rear arm, second pivotal connections respectively connecting a first portion of the rear arm to the body structure and a second portion of the rear arm to the swivel axle unit, said second pivotal connections having pivot centers located on a first line perpendicular to said plane of the wheel, the steering structure comprising a steering rack, a steering link rod, third pivotal connections respectively connecting a first portion of the steering link rod to the steering rack and a second portion of the steering link rod to the swivel axle unit, said third pivotal connections having pivot centers located on a second line convergent with said first line in a direction away from said axis, the pivot centers of said second and third pivotal connections constituting corners of an articulated quadrilateral structure, and a damping support device comprising a hydraulic shock absorber and a coaxial coil spring interposed between the body structure and the lower wishbone structure, a lower part of the hydraulic shock absorber being combined with a yoke pivotably connected to the rear arm, the yoke defining a space for the passage of a transmission shaft driving the wheel.

2. A suspension as claimed in claim 1, wherein said first pivotal connections are elastically yieldable and allow play in a direction parallel to said longitudinal axis.

3. A front suspension and steering structure for a front drive vehicle having a longitudinal axis and a body structure, said suspension comprising a wheel, a swivel axle unit carrying the wheel which is contained in a plane parallel to said axis, an upper wishbone structure pivoted at one end to the axle unit and at another end to the body structure, a lower wishbone structure having a front arm and a rear arm, first pivotal connections respectively connecting a first portion of the front arm to the body structure and a second portion of the front arm to the rear arm, said first pivotal connections being elastically yieldable and allowing play in a direction parallel to said longitudinal axis, second pivotal connections respectively connecting a first portion of the rear arm to the body structure and a second portion of the rear arm to the swivel axle unit, said second pivotal connections having pivot centers located on a first line perpendicular to said plane of the wheel, the steering structure comprising a steering rack, a steering link rod, third pivotal connections respectively connecting a first portion of the steering link rod to the steering rack and a second portion of the steering link rod to the swivel axle unit, said third pivotal connections having pivot centers located on a second line convergent with said first line in a direction away from said axis, the pivot centers of said second and third pivotal connections constituting corners of an articulated quadrilateral structure.

4. A front suspension as claimed in claim 3, wherein each of said first pivotal connections comprises a bush having flanges, a journal parallel to said axis and integral with the front arm and axially fixed in said bush, and a sleeve structure having two shoulders, said flanges of the bush being in spaced relation to outer faces of the shoulders of the sleeve structure, said sleeve structures being respectively mounted on the body structure and on the rear arm.

* * * * *